United States Patent [19]

Anderten et al.

[11] 4,164,172

[45] Aug. 14, 1979

[54] METHOD AND APPARATUS FOR VENTILATING AN OCCUPIED SPACE

[75] Inventors: John R. Anderten, Denver; Glen O. Peter, Northglenn, both of Colo.

[73] Assignee: Energy Controls, Inc., Denver, Colo.

[21] Appl. No.: 880,841

[22] Filed: Feb. 23, 1978

[51] Int. Cl.² ............................................. F24F 11/02
[52] U.S. Cl. ..................................... 98/33 R; 62/78; 128/191 A; 165/16
[58] Field of Search .......................... 236/49; 98/33 R; 165/16; 62/78; 128/191 A

[56] References Cited

U.S. PATENT DOCUMENTS

| | | | |
|---|---|---|---|
| 2,984,082 | 5/1961 | Coblentz | 62/180 |
| 3,587,438 | 6/1971 | Foster | 98/1.5 |
| 3,593,711 | 7/1971 | Staub, Jr. et al. | 128/191 R |

*Primary Examiner*—William E. Wayner

*Attorney, Agent, or Firm*—Sheridan, Ross, Fields & McIntosh

[57] ABSTRACT

Method and apparatus for controlling the amount of outside air introduced into a given space being ventilated as a function of the oxygen content of the air in the space to minimize the energy expended in heating or cooling air flowing through the space while maintaining the oxygen content of the air above that required for the well-being of humans occupying said space. A fuel cell produces an electric current the magnitude of which is a function of the partial pressure of the oxygen present in the air surrounding the fuel cell. The output of the fuel cell is applied to a control circuit which applies control signals to the motor control circuit of a damper motor to admit outside air when the partial pressure of the oxygen in the occupied space falls to a predetermined minimum level and to exclude outside air and to recirculate return air when the partial pressure of the oxygen in the space rises to a certain maximum level.

4 Claims, 4 Drawing Figures

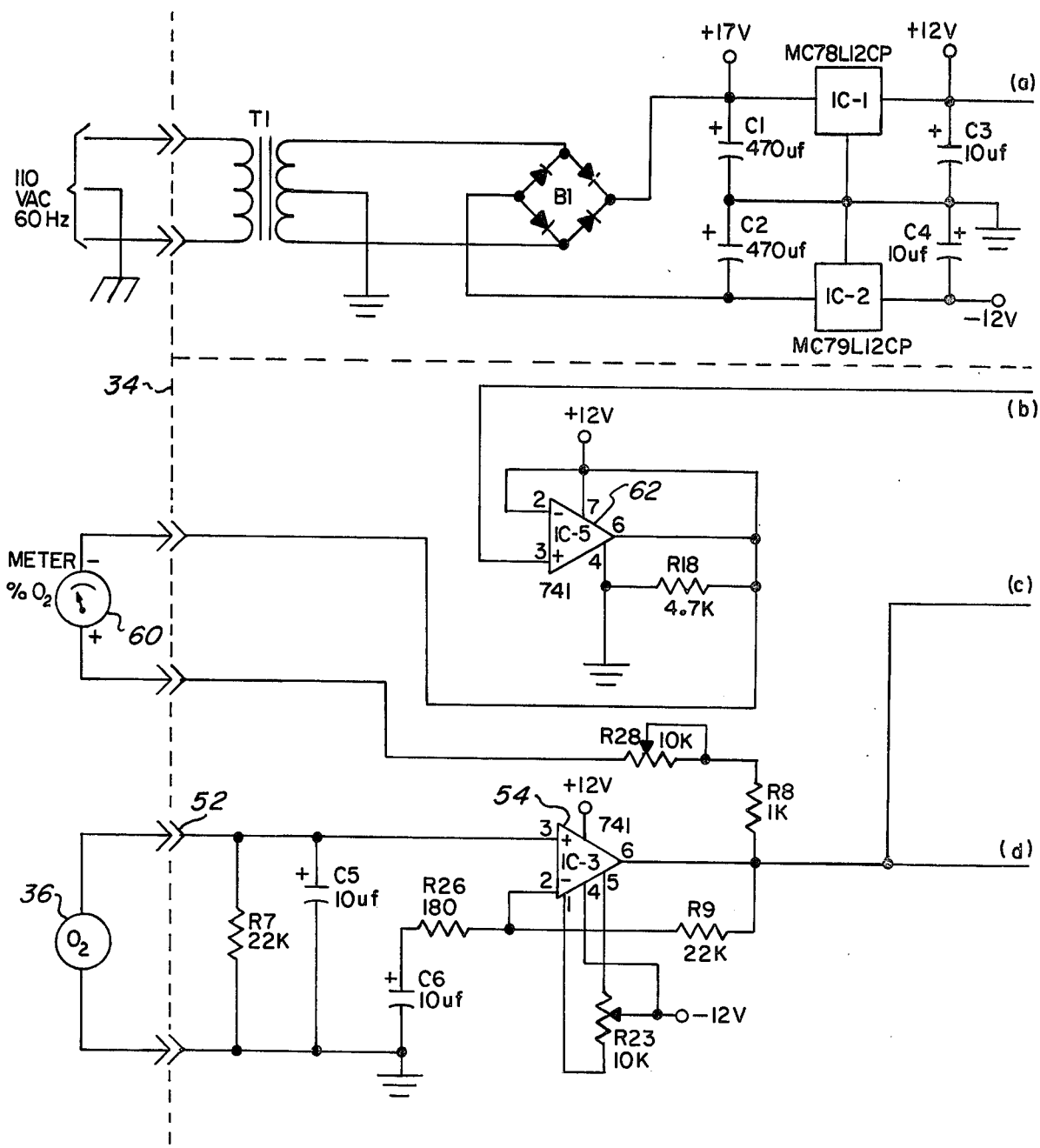
Fig_3a

METHOD AND APPARATUS FOR VENTILATING AN OCCUPIED SPACE

BACKGROUND OF THE INVENTION

1. Field of the Invention

This invention is in the field of methods and apparatus for ventilating an occupied space in conjunction with heating and cooling the air in the occupied space by controlling the amount of outside air introduced to maintain the oxygen content of the air in the occupied space within a predetermined range, particularly when the outside air needs to be heated or cooled, to minimize the energy used in heating or cooling the air flowing through said space.

2. Description of the Prior Art

Systems for ventilating occupied spaces, spaces occupied primarily by humans such as commercial office buildings, theaters, auditoriums and the like and for heating or cooling the air being circulated through such occupied spaces are commonplace. Such prior art systems control primarily the temperature of the air being introduced into the occupied space by heating or cooling the air and controlling the amount of return air mixed with outside air to maintain the temperature and humidity of the air in the space within predetermined limits, or ranges of values.

In addition to the temperature and relative humidity, another characteristic of air of importance to the occupants of such a space is the amount of oxygen present in the air being circulated through the space. In prior art systems the amount of oxygen in the air of an occupied space has not been treated as a controllable variable such as temperature but rather as a constant.

Past methods of assuring that the amount of oxygen present in the air in an occupied space was at least adequate have required that from 5 to 7 cubic feet per minute of outside air per person for the maximum number of persons permitted in the space be introduced into the space by the ventilating system, or have required that 50 percent of the air flowing into the space be outside air. The amount of outside air introduced into such spaces is usually determined by local building codes. Essentially all such building codes require at any time a given space is occupied, that outside air be introduced into the space on the basis of the maximum occupancy of the space rather than on the actual occupancy at any given time, or to state it another way, on the basis of the rate oxygen is being used or consumed.

The introduction of fixed amounts of outside air whenever the space being ventilated is occupied, particularly when the temperature or humidity, or both, of the outside air is such that the predetermined mixture of outside air and return air must be heated or cooled, greatly increases the amount of energy required to maintain the temperature and humidity of the air in the space within desired limits compared with the amount of energy consumed if the amount of outside air introduced were based on the amount needed to maintain the oxygen content of the air in the space within an acceptable range of values.

PRIOR ART STATEMENT

The following reference is submitted under the provision of 37 CFR 1.97(b):

U.S. Pat. No. 3,429,796, Lauer.

Lauer (U.S. Pat. No. 3,429,796) discloses an electrochemical gas analyzer, or fuel cell, which can be used to detect the amount of oxygen present in a gas mixture such as air.

SUMMARY OF THE INVENTION

The present invention provides methods and apparatus for controlling the amount of oxygen in the air in an occupied space by measuring the amount of oxygen in the air in the space and controlling the amount of outside air introduced into the space to maintain the amount of oxygen in the air in said space within predetermined limits. The upper limit is less than the amount of oxygen in the atmosphere, and the lower limit is well above that at which the human occupants would suffer any ill effects.

The partial pressure of the air in the space being ventilated is sensed or measured by a fuel cell whose electrical power output is a function of the partial pressure of the oxygen of the air surrounding the fuel cell. The output current of the fuel cell is amplified and compensated for temperature variations and is applied to an oxygen control circuit which causes a motor control circuit of a damper motor to open an outside air damper to permit outside air to flow into an inlet air duct of the ventilating system, to close a return air damper to prevent return air from flowing into the inlet duct and to open an exit air damper to exhaust the return air from the space being ventilated to the atmosphere when the oxygen content of the air in the space being controlled falls below a predetermined value. The output of the fuel cell when the oxygen present exceeds a predetermined value, controls the damper motor to close the outside air damper and exit air damper and to open the return air damper so that no outside air is admitted through the outside air damper which reduces the amount of energy used in heating and cooling the air being circulated through the space to a minimum.

The problems of the prior art air conditioning systems for occupied spaces such as theaters, auditoriums and the like are solved by treating the oxygen content of the air in the occupied space as a variable which is measured and controlled as are temperature and humidity in prior art systems instead of treating the amount of outside air introduced as a constant. This minimizes the amount of outside air brought into such systems and as a consequence, the amount of energy required to heat or cool the air circulating through a given occupied space.

It is therefore an object of this invention to provide improved methods and apparatus for ventilating an occupied space in which the amount of outside air introduced into the space is a function of the amount of oxygen in the air in said space.

It is a further object of this invention to provide improved methods and apparatus in an air conditioning system for an occupied space in which one of the controlled variables is the partial pressure of oxygen in the air in said space which is measured and is used to control the amount of outside air introduced into said space to maintain the partial pressure of oxygen in said space within predetermined limits.

It is yet another object of this invention to provide methods and apparatus for limiting the amount of outside air introduced into an occupied space to that necessary to maintain the partial pressure of the oxygen of the air in that space within predetermined limits which substantially minimizes the amount of energy required to heat or cool the air introduced into said space while maintaining all controlled variables, i.e., temperature, relative humidity and oxygen content within acceptable limits.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be affected without departing from the spirit and scope of the novel concepts of the disclosure, and in which:

FIGS 3a and 3b taken together as one are a schematic diagram of the oxygen control circuit of the invention.

DESCRIPTION OF THE PREFERRED EMBODIMENT

Figure 1:
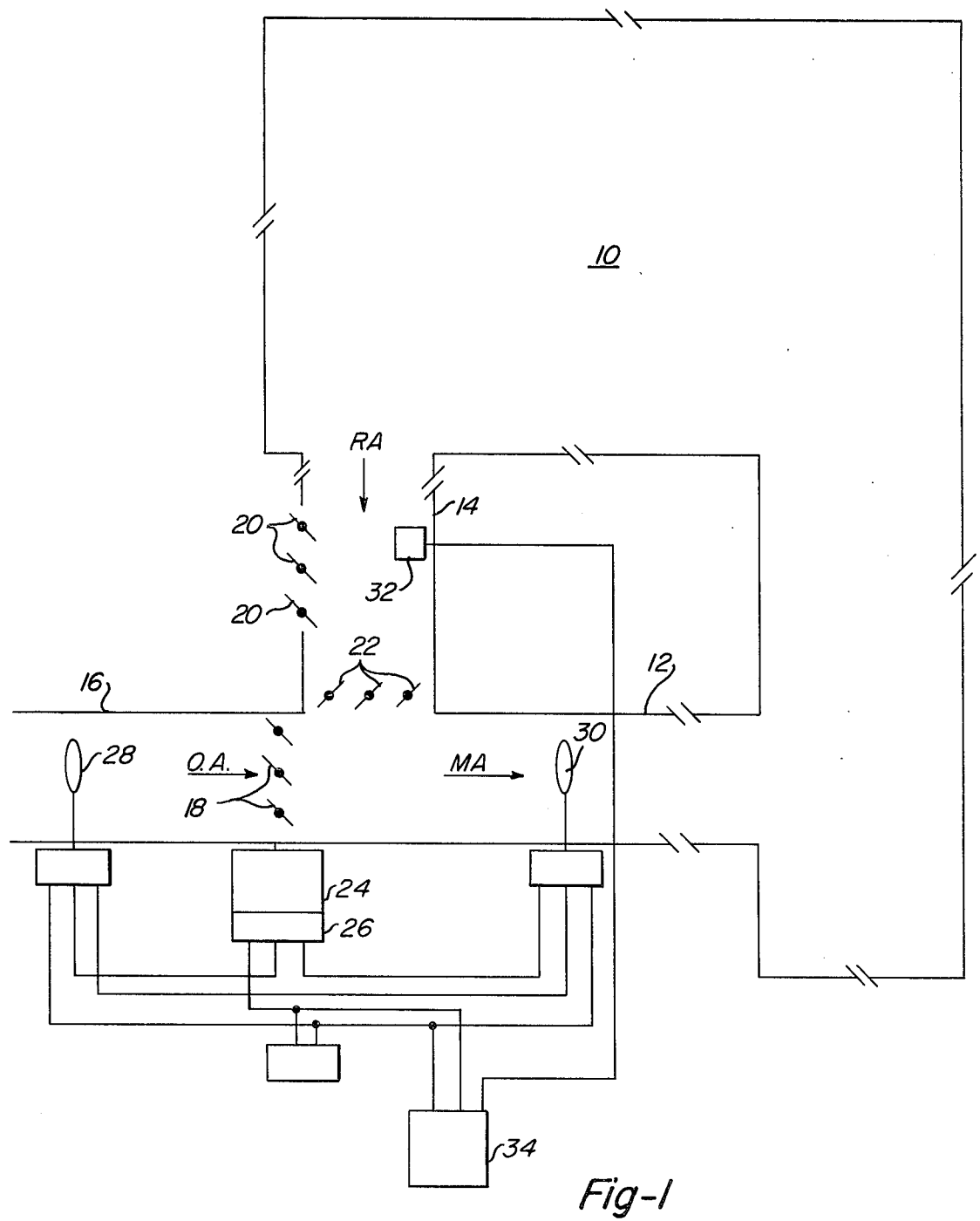
FIG. 1 is a schematic diagram of a portion of an air conditioning system of an occupied space illustrating elements of the invention.

Referring to FIG. 1, the occupied space is designated by reference numeral 10 which space could be a commercial office building, a theater or an auditorium, or the like. In the simplified schematic view of FIG. 1 air designated as mixed air, or MA, flows into space 10 through inlet duct 12 and out of space 10 through return air duct 14. Outside air, designated OA, from the atmosphere is permitted to flow into inlet duct 12 through air intake vent 16 if outside air damper 18 is open. Return air, designated RA, flowing into return air duct 14 is vented, or exhausted, to the atmosphere if exit air damper 20 is open, particularly when return air damper 22 is closed. Dampers 18, 20 and 22 are opened or closed by a conventional damper motor 24 such as a Modutrol motor Model M945A which is a product of Honeywell Inc. Operation of conventional motor 24 is controlled by conventional motor control circuit 26.

Sensor 28 is used to measure, for example, the temperature and relative humidity of the outside air and sensor 30 to measure the temperature and relative humidity of mixed air, a combination of return air and outside air entering inlet duct 12, to control damper motor 24 and to control the means to add or remove heat from mixed air flowing through inlet duct 12 by conventional means which are not illustrated in FIG. 1 since they form no part of the invention.

In FIG. 1 oxygen sensor 32 is illustrated as being located in return air duct 14. It can, with equal efficacy, be located in space 10. The output signal from sensor 32 is applied to oxygen control circuit 34 which in turn is connected to the motor control circuit 26 of damper motor 24 to open OA damper 18 and exit air or EA damper 20 and to close RA damper 22 when the oxygen level measured by sensor 32 falls below a predetermined level and to close OA damper 18 and EA damper 20 and open RA damper 22 when the oxygen level in the air surrounding oxygen sensor 32 exceeds another predetermined level.

The temperature controlling portion of the air conditioning system, for example, can cause damper motor 24 to open OA damper 18, EA damper 20 and close RA damper 22 on those normally rare occasions when introducing more outside air into space 10 will reduce the energy required to heat or cool the mixed air flowing through inlet duct 12 to maintain the temperature within space 10 within the desired operating ranges.

Figure 2:
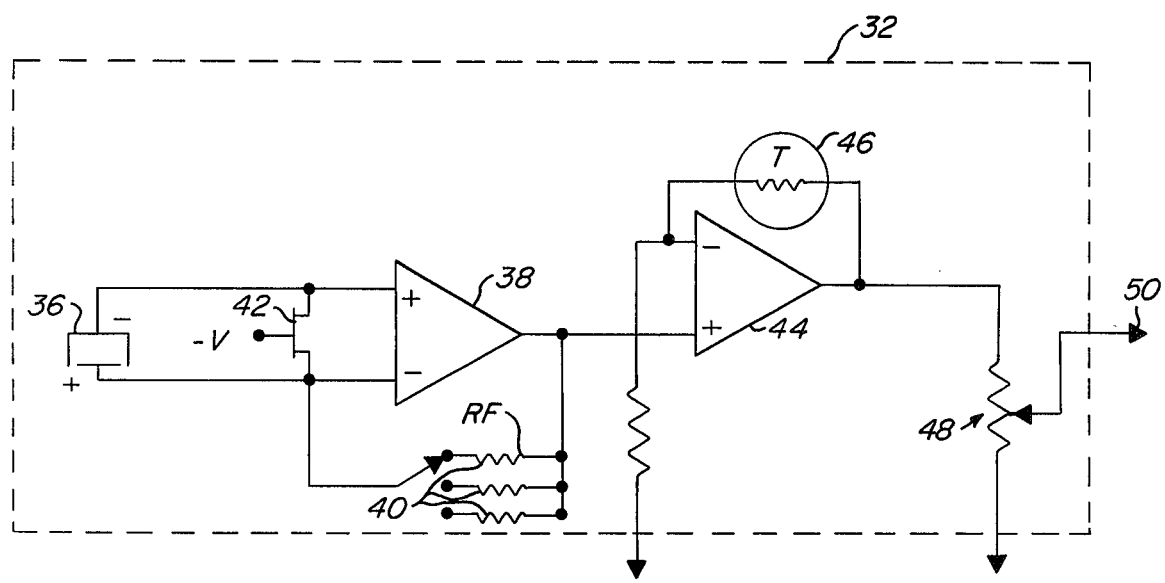
FIG. 2 is a schematic diagram of the oxygen sensor of the invention.

In FIG. 2 oxygen sensor 32 has an electrochemical transducer, or hybrid fuel cell 36, which in a preferred embodiment is a Micro-fuel cell, a product manufactured by Teledyne Analytical Instruments which produces electrical power in the range of from 1 to 200 microwatts. The rate at which electrons are produced by such a fuel cell is directly proportional to the concentration, or partial pressure, of oxygen in the gaseous mixture, air, surrounding cell 36. The rate at which oxygen diffuses through the sensing membrane of the cell is temperature sensitive and therefore the output current of fuel cell 36 will vary as a function of temperature at a rate of about 2.5%/° C. It should be noted that the output current of fuel cell 36 is essentially independent of the rate of air flow around it.

To produce an output signal having more useful characteristics, the output current of fuel cell 36 is applied to the input terminals of a conventional operational amplifier 38. The output voltage of OP amp 38 depends upon the magnitude of the feedback resistor 40 connected between the output terminal and the negative input terminal, as is well known in the art. N-channel field effect transistor (FET) 42 is connected between the positive and negative input terminals of OP amp 38 and has its gate connected to a negative source of electrical potential (−V) when the oxygen sensor circuit 32 is energized so that a high resistance, around $10^{12}$ ohms exists at such time. When sensor 32 is deenergized, particularly if the gate of FET 42 is not connected to −V, the resistance of FET 42 drops to approximately 30 ohms to provide a low resistance load for fuel cell 36 which continues to produce electric current or power as long as it is exposed to oxygen.

The output voltage of OP amp 38 is applied to the positive input terminal of OP amp 44. A negative temperature coefficient thermistor 46 is utilized as the feedback resistance between the output terminal of OP amp 44 and its negative or inverting input terminal to compensate for the positive temperature coefficient of fuel cell 36. The output voltage of OP amp 44 is applied across the resistor portion of potentiometer 48. The position of the movable element of potentiometer 48 determines the output voltage at the output terminal 50 of oxygen sensor 32.

Figure 3B:
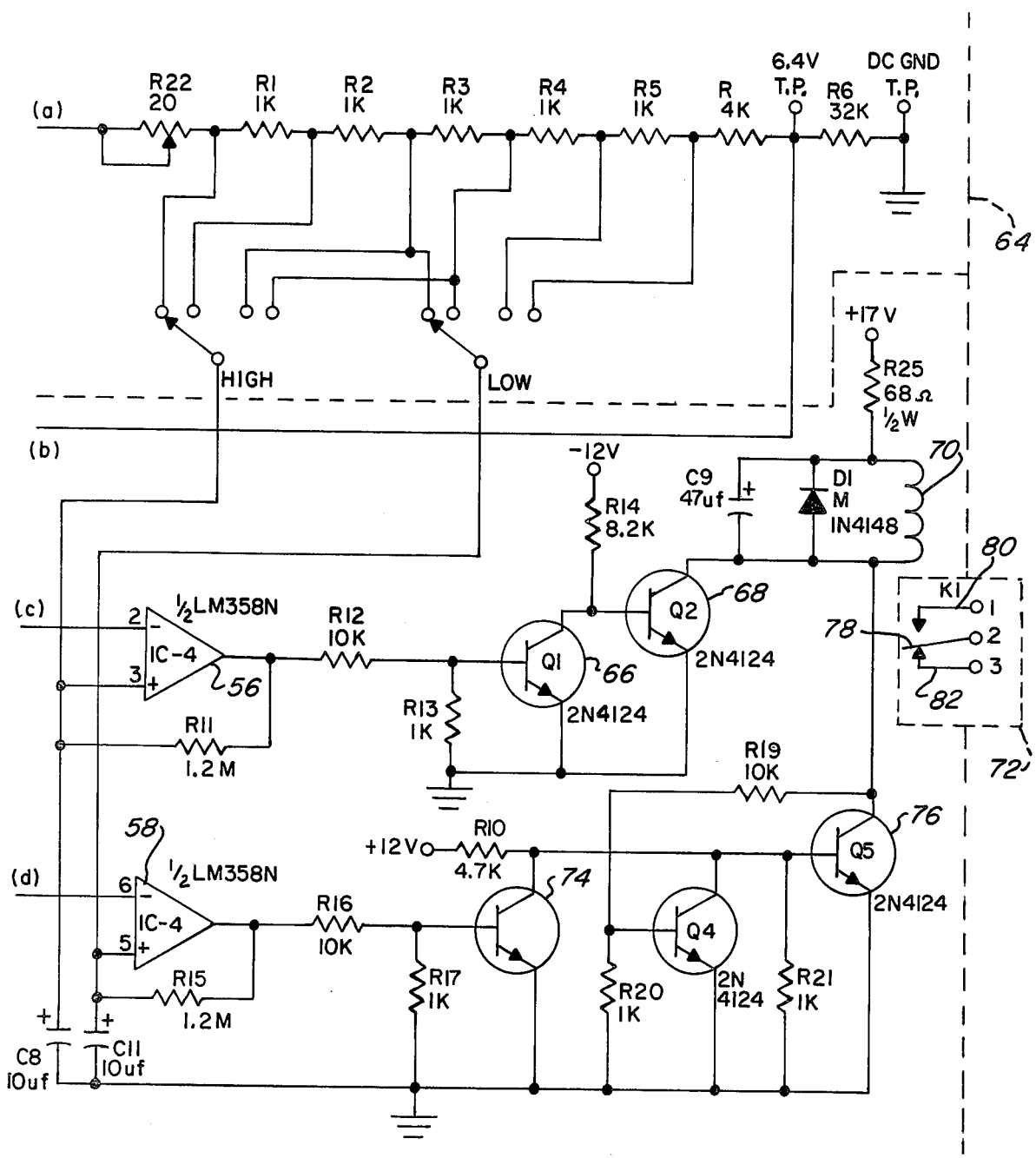

In FIG. 3, which is a preferred embodiment of the oxygen control circuit 34, the output terminal 50 of oxygen sensor 32 is connected to input terminal 52 of circuit 34. The output signal of sensor 32 is applied to the positive or noninverting, input terminal of OP amp 54 which amplifies it. The output of OP amp 54 is connected to the negative, or inverting, input terminals of OP amps 56, 58 and may be connected through meter 60 to the negative input terminal of OP amp 62 if it is desired to use meter 60 to display the amount of oxygen measured, or sensed, by fuel cell 36. Meter 60 is normally calibrated in terms of percentage of oxygen being measured by fuel cell 36. It could be calibrated in terms of the partial pressure of the oxygen if so desired.

The positive input terminals of OP amps 56, 58 are connected to a conventional source of regulated dc potential 64 to provide reference voltages having predetermined magnitudes for reasons which will be explained below. In the preferred embodiment, the potential of the positive input terminal of OP amp 58 is set at +7.8 volts dc and the potential of the positive input terminal of OP amp 56 is set at +8.2 volts dc. In the preferred embodiment a voltage of +7.8 volts corresponds to the oxygen being measured by fuel cell 36 having an oxygen content of 19.5 percent and the +8.2 volts corresponds to the oxygen in the air being measured by fuel cell 36 corresponding to 20.5 percent. Obviously the voltages and the corresponding oxygen contents of the air being measured can be varied within limits as long as the lower limit is not below that at which occupants of the space would suffer any ill effects which has been set at 19 percent by OSHA. The feedback resistors of Op amps 56, 58 are connected to provide positive feedback so that the output voltage of OP amp 56, for example, will go positive, approaching the positive power supply voltage as a limit, when the magnitude of the voltage applied to the positive input terminal is greater than the voltage applied to the negative input terminal; and will go negative, approaching the negative power supply voltage as a limit when the voltage applied to the negative input terminal is of greater magnitude than the reference voltage applied to the positive input terminal as is well known to those skilled in the art concerning operational amplifiers.

When the magnitude of the output voltage of OP amp 54, which is a function of the amount of oxygen present in the air surrounding fuel cell 36, or more particularly the partial pressure of the oxygen in the air, exceeds the voltage applied to the positive input terminal, +8.2 volts dc which corresponds to the oxygen in the air being 20.5 percent of the total gases, the output voltage of OP amp 56 goes negative which turns off npn transistor 66 which in turn turns on npn transistor 68. When transistor 68 turns on current flows through coil 70 of relay 72 and transistor 68. In a similar manner when the output voltage of OP amp 54 is greater than the reference voltage applied to the positive input terminal of OP amp 58, the output voltage of OP amp 58 will go negative turning off npn transistor 74 which turns on npn transistor 76. When transistor 76 turns on current flows through coil 70 of relay 72 and through transistor 76 to ground. When the output voltage of OP amp 54 is less than the reference voltage applied to the positive input terminal of OP amp 56, the output voltage of OP amp 56 goes positive turning on transistor 66 which turns off transistor 68. In a similar manner when the output voltage of OP amp 54 is less than the reference voltage applied to the positive input terminal of OP amp 58, the output voltage of OP amp 58 goes positive which turns on transistor 74 and turns off transistor 76 so that no current flows through coil 70 and through transistor 76.

Relay 72 is used to produce signals which control damper motor 24. When current flows through both of transistors 68 and 76 which will occur when the output voltage of OP amp 54 is greater than either of the reference voltages applied to the positive input terminals of OP amps 56, 58, the magnetic field produced by the current flowing through coil 70 is strong enough to cause the movable element 78 of relay 72 to engage fixed contact 80 which will cause damper motor 24 to be energized to close the outside air damper 18 and exit air damper 20 and to open the return air damper 22. This occurs when the output voltage of OP amp 54 is greater than +8.2 volts in the preferred embodiment which corresponds to the oxygen content of the air being measured by the fuel cell equaling or exceeding 20.5 percent, which is slightly less than the oxygen content of the atmosphere which is substantially equal to 20.95 percent. When the output voltage of OP amp 54 drops below +8.2 volts but is greater than +7.8 volts, the output voltage of OP amp 56 goes positive, turning on transistor 66 and turning off transistor 68 while the output voltage of OP amp 58 remains negative so that transistor 76 will remain on. Enough current will flow through coil 70 and transistor 76 to maintain movable element 78 in contact with fixed terminal 80 which will keep OA damper 18 closed, EA damper 20 closed and RA damper 22 open. When the magnitude of the output voltage of OP amp 54 drops below the reference voltage applied to the positive input terminal of OP amp 58, the output voltage of OP amp 58 goes positive, turning transistor 74 on and transistor 76 off which deenergizes coil 70 since no current will be flowing through either transistor 76 or 68 at such time. Movable contact 78 which is spring biased toward fixed contact or terminal 82 will move into contact with terminal 82 which causes the damper motor 24 to open OA damper 18, EA damper 20 and to close the RA damper 22 which admits outside air into inlet duct 12.

As the oxygen content in the air sensed or measured by fuel cell 36 increases, the output voltage of OP amp 54 increases above +7.8 volts. This causes the output voltage of OP amp 58 to go negative, turning off transistor 74 and turning on transistor 76. The current flowing through coil 70 when only transistor 76 is conducting is not enough to produce a magnetic field strong enough to cause movable element 78 to move into contact with terminal 80 because relay 72 requires current flow through both of transistors 76 and 78 to do this. Thus, dampers 18, 20 and 22 will stay in the position to admit outside air until fuel cell 36 produces an output voltage of +8.2 volts, in the preferred example, the magnitude of which corresponds to, or slightly exceeds, the maximum limit of the range of oxygen partial pressures, which in the preferred embodiment corresponds to an oxygen content equaling 20.5 percent. As a result the oxygen content of the air in the enclosed space 10 is measured and used to control the amount of outside air introduced to maintain the air in space 10 between predetermined limits, 19.5 to 20.5 percent of oxygen in the preferred embodiment as represented by the magnitude of the reference voltages applied to the respective positive input terminals of OP amps 56 and 58.

The movable element 78 of the relay is spring biased toward the position in which outside air is introduced into the inlet duct. Thus, if there were a failure in the oxygen control system, the system will fail safe in the sense that the OA, EA and RA dampers 18, 20 and 22 will be positioned to admit the maximum amount of outside air.

It should be noted that fuel cell 36 is a relatively small device approximately 1¾ inches in diameter and 3/4 inches thick so that it can be positioned almost anywhere in the occupied space or in the return air duct. Such fuel cells will have a life in air of from 12 to 18 months so that it is only necessary to once a year replace the fuel cell with a new one in order for the system to continue to operate safely. Oxygen sensor circuit 32 can be provided with the capability of detecting an incipient failure of fuel cell 36 and providing a suitable alarm or notice.

Treating the oxygen content of the air in an occupied space as a controllable variable using the methods and apparatus of this invention has in tests run on theaters reduced the time that the compressors used to cool the air, for example, by one third which of course produces a commensurate reduction in the amount of electrical energy consumed compared with a similar theater which treated the amount of outside air to be introduced as a constant as taught by the prior art.

While the method and apparatus for practicing the invention has been disclosed as being electronic controls, it is possible to practice the invention using electric or pneumatic control systems as well as electronic proportional controls. In addition, it is possible to utilize this system and method in controlling the environment, including oxygen content in buildings or other space occupied by animals, such as poultry, livestock, etc. Obviously many modifications and variations of the present invention are possible in the light of the above teachings. It is, therefore, to be understood that within the scope of the appended claims, the invention may be practiced other than as specifically described and illustrated.

What is claimed is:

1. In a heating, ventilating and cooling system for an occupied space, the air for such a space being supplied through an inlet duct, the air removed from the space flowing through a return air duct, an outdoor air damper for admitting outside air into the inlet duct when open; an exit air damper for permitting return air to be exhausted to the atmosphere when open; a return air damper for permitting return air to flow into the inlet duct when open; a damper motor connected to the outdoor, the exit and the return air dampers to position the dampers to control the amount of outside air introduced into the inlet duct; and damper motor control means for causing the damper motor to position the dampers, the improvements comprising:

means for sensing the partial pressure of the oxygen in said space and for producing an electrical signal which is a function of the partial pressure of the oxygen;

control means to which the electrical signal from the means for sensing oxygen is applied for producing a first signal when the partial pressure of the oxygen decreases below a certain predetermined minimum value and a second signal when the partial pressure of the oxygen increases above a second predetermined maximum value; and means for applying said signals produced by said control means to said motor control means, said motor control means in response to said first signal being produced causing said damper motor to position the dampers to increase the amount of outside air introduced and in response to said second signal being produced causing said damper motor to position the dampers to decrease the amount of outside air introduced to maintain the partial pressure of the oxygen of the air in the occupied space substantially between the maximum and minimum predetermined values.

2. In a ventilating system for an occupied space having a return air duct; an inlet air duct; an outdoor air damper for admitting outdoor air from the atmosphere into said inlet duct; an exit air damper for permitting return air to be exhausted to the atmosphere; a return air damper for admitting return air into said inlet duct; a damper motor for positioning said dampers to control the amount of outside air and return air that flows into the return air duct; and motor control means for controlling the damper motor, the improvements comprising:

a hybrid fuel cell for producing an electrical output signal which is a substantially linear function of the partial pressure of the oxygen in the air surrounding the fuel cell;

electronic means to which the output voltage of the fuel cell is applied for producing a dc voltage whose magnitude is a function of the partial pressure of the oxygen;

oxygen control circuit means to which the dc voltage produced by the electronic means is applied for producing a second output signal when the output voltage of said electronic means exceeds a predetermined magnitude and a first output signal when the output voltage of said electronic means is less than a predetermined magnitude; and means for applying the output signals of said oxygen control circuit means to the motor control means, said motor control means responsive to said output signals for controlling the damper motor to open the outside air damper and the exit air damper and to close the return air damper when said first signal is produced and to cause the damper motor to close the outside air damper and the exit air damper and to open the return air damper when said second signal is produced.

3. The method of controlling the amount of outside air introduced into an occupied space, in which the air for such a space is supplied through an inlet duct, the air removed from the space flowing through a return air duct, an outside air damper for admitting outside air into the inlet duct when open; an exit air damper for permitting return air to be exhausted to the atmosphere when open; a return air damper for permitting return air to flow into the inlet duct when open; a damper motor connected to the outdoor, the exit and the return air dampers to position the dampers to control the amounts of outside air introduced into the inlet duct; and damper motor control means for causing the damper motor to position the dampers, the improved method comprising the steps of:

sensing the partial pressure of the oxygen in said space;

producing an electrical signal which is a function of the partial pressure of the oxygen in said space;

producing in response to the electrical signal a first control signal when the partial pressure of the oxygen decreases below a certain predetermined minimum value and producing a second signal when the partial pressure of the oxygen increases above a second predetermined value; and applying said control signals to the damper motor control means to cause the damper motor to position the dampers to increase the amount of outside air introduced in response to said first control signal and to position the dampers to decrease the amount of outside air introduced in response to said second signal being produced to maintain the partial pressure of the oxygen of the air in the occupied space substantially between the maximum and minimum values.

4. The method of controlling the admission of outside air into an occupied space provided with a ventilating system having a return air duct, an inlet air duct, an outdoor damper for admitting outdoor air from the atmosphere into said inlet duct, an exit air damper for causing return air to be exhausted to the atmosphere, a return air damper for admitting return air into said inlet duct, a damper motor for positioning said dampers to control the amount of outside air and return air flowing into the return air duct, comprising the steps of:

producing an electrical output signal which is a substantially linear function of the partial pressure of the oxygen in the air in said space;

producing in response to the output signal a dc voltage whose amplitude is a function of the partial pressure of the oxygen;

producing a second control signal when the amplitude of the dc voltage exceeds a predetermined magnitude and a first control signal when the amplitude of the dc voltage is less than a second predetermined magnitude; and controlling the damper motor in response to said control signals to cause the damper motor to open the outside air damper and the exit air damper and to close the return air damper when said first signal is produced and to cause the damper motor to close the outside air damper and the exit air damper and to open the return air damper when said second signal is produced.

* * * * *